(12) United States Patent  
Diez

(10) Patent No.: US 6,179,032 B1
(45) Date of Patent: *Jan. 30, 2001

(54) BEAD DEPRESSOR

(75) Inventor: Ulrich Diez, Reichshof (DE)

(73) Assignee: Hofmann Werkstatt-Technik GmbH, Pfungstadt (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/112,134

(22) Filed: Jul. 9, 1998

(30) Foreign Application Priority Data

Jul. 9, 1997 (DE) .............................. 197 29 416

(51) Int. Cl.[7] .................................................. B60C 25/05
(52) U.S. Cl. ............................................ 157/1.1; 157/1.3
(58) Field of Search ................... 157/1, 1.1, 1.3

(56) References Cited

U.S. PATENT DOCUMENTS

| 2,485,700 | 10/1949 | Cook . | |
|---|---|---|---|
| 2,545,483 | 3/1951 | Martin . | |
| 2,684,710 | 7/1954 | Calvin . | |
| 2,925,857 | * 2/1960 | Twiford | 157/1 |
| 3,266,548 | * 8/1966 | Kolosowsky | 157/1.33 |
| 3,709,278 | * 1/1973 | Comer | 157/1 |
| 3,747,661 | 7/1973 | Freyling . | |
| 4,271,884 | * 6/1981 | Udall et al. | 157/1 |
| 4,491,165 | * 1/1985 | Mott | 157/1 X |
| 5,022,451 | * 6/1991 | Fenderson | 157/1.33 X |

* cited by examiner

Primary Examiner—James G. Smith
(74) Attorney, Agent, or Firm—Pillsbury Madison & Sutro LLP

(57) ABSTRACT

A bead depressor for use upon fitting or removal of a tire whereby a tire bead is held in a well base of a wheel comprises a plurality of depressor elements connected together by a cable, and a clamping bar which can be arrested in a centering bore in the wheel. The first depressor element which in use is fixed on the rim flange of the wheel is connected to the clamping bar by a holding rod member and an additional elastic clamping element is operative between the clamping bar and the first depressor element to urge the latter substantially radially against the rim flange and to tilt the clamping bar to arrest it in the centering bore in the wheel.

24 Claims, 2 Drawing Sheets

BEAD DEPRESSOR

FIELD OF THE INVENTION

The invention relates to a bead depressor for use in fitting a tire onto or removing a tire from a wheel, and more specifically, for holding a bead of a tire to be fit or removed in a rim well base of a disk wheel.

BACKGROUND OF THE INVENTION

When a motor vehicle tire is to be fit on to or removed from a wheel, such as a disk wheel, which is held in position on a tire-fitting machine, a bead depressor with a plurality of bead depressor elements which are connected together by a cable, that provide for depressing the tire bead into and holding it in the rim well base of the wheel can be used. This fitting tool is of particular advantage more especially when dealing with wide tires having hard side walls. Of the depressor elements which are connected together by the above-mentioned cable, a first depressor element is connected by a holding rod member to a clamping bar, which is fit through a centering bore in the center of the wheel and which is clamped fast to a wheel-mounting assembly of the tire-fitting machine. Therefore, that form of bead depressor can only be used in connection with tire-fitting machines that have a wheel-mounting assembly of a particular configuration, which is suitable for clamping fast the clamping bar.

SUMMARY OF THE INVENTION

An object of the present invention is to provide a bead depressor for use in fitting or removing a tire on a wheel, which can be used irrespective of the type of tire-fitting machine.

Another object of the present invention is to provide a bead depressor for use in fitting or removing a tire bead, which is of a simple design configuration while affording reliability of operation in terms of certainty of bead depression and enjoying substantial universality of use.

Still another object of the present invention is to provide a bead depressor assembly enjoying enhanced simplicity of operation.

In accordance with the principles of the present invention, the foregoing and other objects are attained by a bead depressor with which, upon fitting or removing of a tire, a bead of the tire is held in a rim well base of a wheel, such as a disk wheel. The bead depressor comprises a plurality of depressor elements, which are connected together by a cable and of which a first depressor element is adapted to be fixedly clamped to a rim flange of the wheel by a clamping bar adapted to be disposed in a centering bore in the wheel, and a holding rod member which connects the first depressor element to the clamping bar. The bead depressor has means for arresting the clamping bar in the centering bore in the wheel, and a clamping element, which is operative between the first depressor element and the part of the clamping bar which projects beyond the wheel. The clamping element is operative to urge the first depressor element substantially in a radial direction against the rim flange.

As will be seen from preferred embodiments of the bead depressor according to the invention which are described in greater detail hereinafter, the fact that the clamping bar can be suitably arrested in the centering bore in the wheel and the depressor element can be firmly pressed against the rim flange of the wheel by the clamping element, which is possibly of a rubber-elastic nature, means that attaching the bead depressor by the clamping bar is independent of the type of tire-fitting machine on which the tire fitting or removal procedure is implemented.

In a preferred embodiment of the invention, the clamping bar can be arrested in the centering bore in the disk wheel by the clamping bar being subject to the effect of a clamping force acting in a substantially radially outward direction by the clamping element. In that situation, the clamping bar can adopt a position in which it is obliquely inclined with respect to the axis of the wheel and is held or clamped in position in the centering bore in the wheel, bearing against diametrally opposed disposed locations in the centering bore, by virtue of the radially outwardly acting force produced by the clamping element. To promote the arresting action, the clamping bar may be provided with engagement configurations for cooperating with the centering bore, for example, arresting notches or recesses in the clamping bar. As a result, secure engagement of the clamping bar against diametrally opposed disposed edges of the centering bore is achieved. The clamping element can operatively engage the upper end of the part of the clamping bar which projects beyond the wheel, in order to produce the highest possible level of torque urging the clamping bar into the inclined position to produce the arresting effect.

The holding rod member by which the first depressor element is mounted to the clamping bar can be mounted displaceably on the clamping bar. The mounting location at which the holding rod member is mounted to the part of the clamping bar that projects beyond the wheel can be rotatable or pivotable about an axis which is perpendicular to the axis of the clamping bar. That can provide for adaptation to different disk wheel dimensions.

In a preferred embodiment of the invention the clamping element can be in the form of a rubber-elastic element and can be formed, for example, by one or more rubber cords. The clamping element may, however, also be formed by the holding rod member, which can be of a flexurally resilient nature, in which case the functions of the holding rod member and the clamping element are performed by one and the same component.

Further objects, features and advantages of the present invention will be apparent from the following description of preferred embodiments thereof.

DESCRIPTION OF CURRENTLY PREFERRED EMBODIMENTS OF THE PRESENT INVENTION

Figure 1:
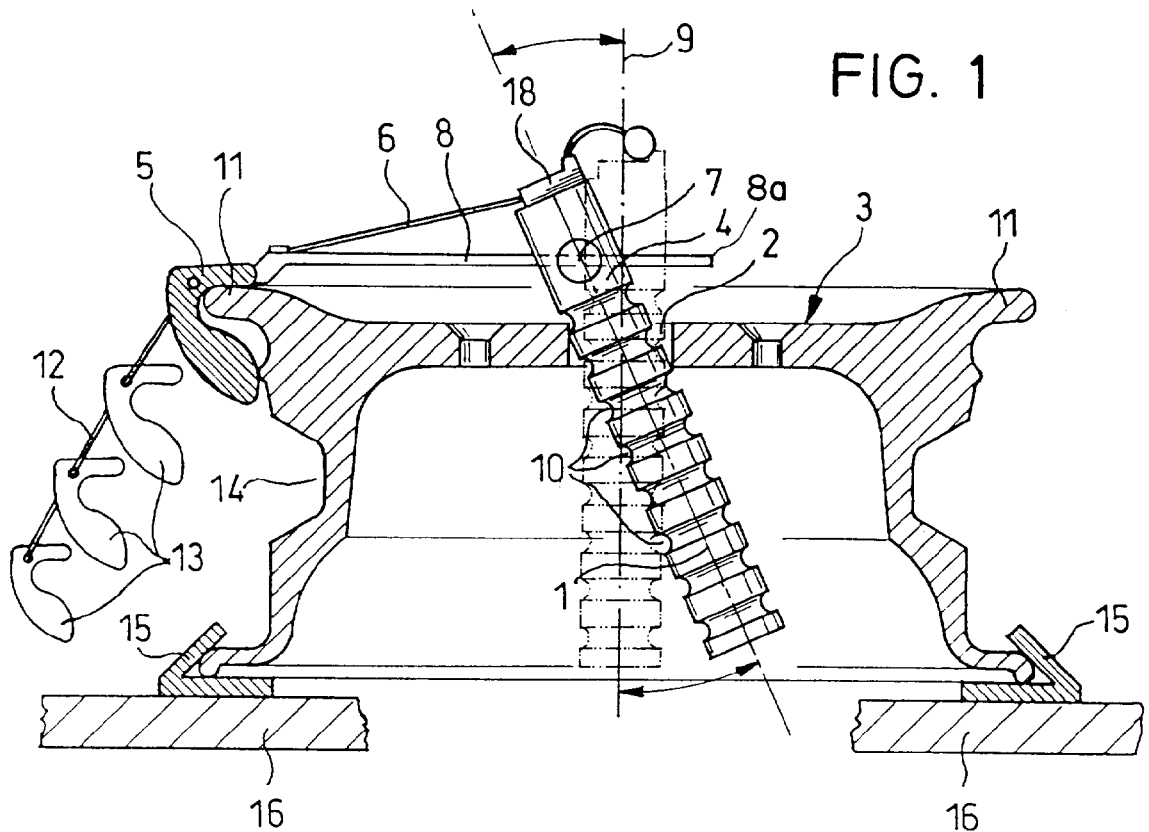
FIG. 1 is a sectional view of a first embodiment of the bead depressor according to the present invention, in the situation of use in relation to a disk wheel.
Figure 2:
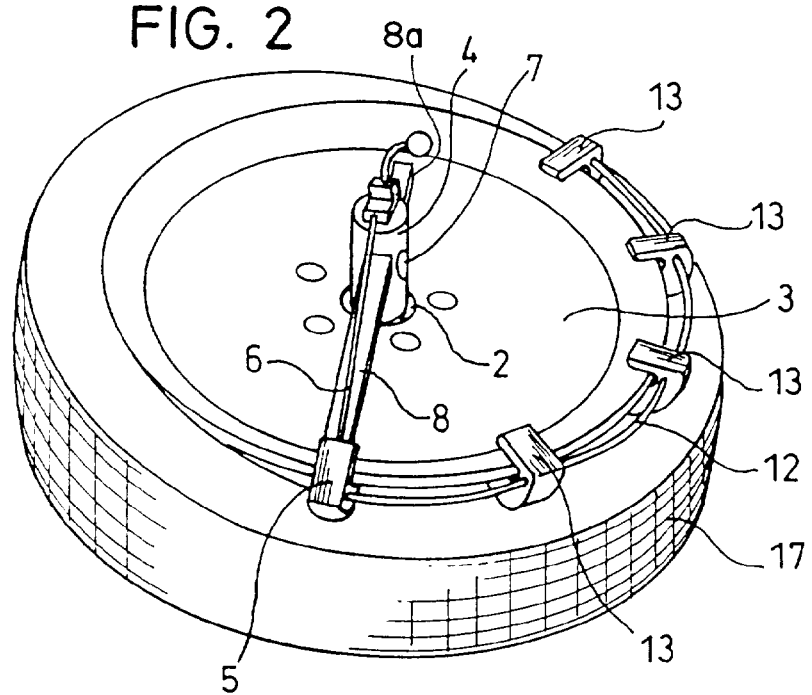
FIG. 2 is a perspective view showing the bead depressor of FIG. 1 in use on a motor vehicle wheel with tire.

Referring to FIG. 1, reference numeral 3 therein shows a disk wheel for a motor vehicle. The disk wheel 3 is secured by clamping claws 15 to the rotary turntable 16 of a tire-fitting machine. To assist with the procedure for fitting the tire indicated at 17 in FIG. 2 on to the disk wheel 3 or for removing a fitted tire from a disk wheel 3, a bead depressor comprising a plurality of bead depressor elements (5 and 13) is used. The plurality of bead depressor elements 5 and 13 are connected together in succession by a cable 12. The first depressor element 5 of the series thereof is connected to a clamping bar 1 by a holding member 8 in the form of a rod. The clamping bar 1 is fit into a centering bore 2 in the disk wheel 3 and suitably arrested therein, as illustrated in FIGS. 1 and 2.

In order to press the bead of the tire 17 into a rim well base (indicated at 14 in FIG. 1) of the wheel 3 along approximately half the periphery of the wheel 3, the depressor elements 5 and 13 are fit to a rim flange 11, the upper rim flange in FIG. 1, of the disk wheel 3. FIG. 1 shows that the depressor elements 5 and 13 are configured such that, as illustrated more specifically in relation to the depressor element 5, the depressed elements each embrace the rim flange 11 to be clampingly secured thereto. A clamping arrangement is provided for securing the first depressor element 5 and therewith the further depressor elements 13, which are connected thereto and to each other by the cable 12, to the disk wheel 3. The clamping arrangement comprises the above-mentioned clamping bar 1 and a clamping element 6 which is operatively disposed between a portion 4 of the clamping bar 1, which projects above the disk wheel 3, and the first depressor element 5, which is fit onto the rim flange 11.

The clamping element 6 has a rubber-elastic or springy nature and, for example, may comprise a mechanical tension spring in the form, for instance, of a coil spring, or one or more rubber cords, which is or are tensioned between the upper end of the portion 4 of the clamping bar 1 and the first depressor element 5. The clamping element 6 can be releasably secured to the upper end of the clamping bar 1 by a suitable fixing device 18, such as a gripping device or the like.

The holding rod member 8 is mounted on the upper portion 4 of the clamping bar 1 displaceably with respect to the clamping bar 1. For that purpose a rotatable or pivotable mounting location 7 is provided for mounting the holding rod member 8 to the portion 4 of the clamping bar 1. The holding rod member 8 can be formed, for example, by a flat steel member or the like. The holding rod member 8 includes a distal end 8a located most proximate to the clamping bar 1 and protruding from the displaceable mounting between the holding rod member 8 and the clamping bar 1. It should be appreciated that the displaceable connection between the holding rod member 8 and the clamping bar 1 may be implemented in any one of conventionally known manners. In the illustrated embodiment in FIG. 1, the other end of the holding rod member 8 is fixedly connected to the first depressor element 5. It is however also possible here to provide a displaceable connection between the holding rod member 8 and the first depressor element 5. The fact that the holding rod member 8 is displaceably mounted on the clamping bar 1 and/or the first depressor element 5 provides for adaptation to different radii of the disk wheels 3. The pivot axis of the mounting location 7 on the clamping bar 1 extends substantially perpendicularly to the axis 9 of the disk wheel 3. That provides for an unimpeded tilting movement of the clamping bar 1 in the centering bore 2 in the disk wheel 3, when the clamping bar 1 is arrested in the centering bore 2.

In the embodiment illustrated in FIGS. 1 and 2, the clamping bar 1 is suitably arrested in the centering bore 2 by the clamping force of the clamping element 6 applying a substantially radially outwardly directed force to the upper end of the portion 4 of the clamping bar 1, which projects upwardly above the centering bore 2 in FIGS. 1 and 2. As a result, the clamping bar 1 is subjected to the effect of torque about an axis at the centering bore 2 so that the clamping bar 1 adopts an inclined position with respect to the axis 9 of the disk wheel 3, as illustrated in FIG. 1, and is suitably clamped fast against diametrally opposed disposed edges of the centering bore 2, in the manner that can be clearly seen from FIG. 1. To promote the clamping or arresting effect, the clamping bar 1 can be provided with suitable engagement means illustrated in the form of arresting notches or recesses 10, at least at mutually oppositely disposed sides thereof. That ensures satisfactory locking engagement against the upper peripherally extending edge and the lower peripherally extending edge of the centering bore 2, at respective diametral locations thereof.

On the other hand the clamping force of the clamping element 6 which is attached on one end to the disk wheel 3 by the clamping bar 1, acts on the first depressor element 5, which is mounted on the rim flange 11. The clamping force applied in a way that causes the first depressor element 5 to be urged substantially radially inwardly to hold it on the rim flange 11 of the disk wheel 3. That provides for satisfactory attachment of the first depressor element 5 and the other depressor elements 13, which are connected by the cable 12, during rotation of the turntable 16 with the wheel 3, and the tire fitting or removal procedure which is carried out in that situation. As can be seen in FIG. 2 in particular, the desired depressor effect on the tire bead is achieved along a part of the periphery of the disk wheel 3, more specifically approximately half the peripheral dimension thereof.

Preferably, both the first depressor element 5 and also the mounting location 7 on the clamping bar 1 provide a support configuration for the holding rod member 8, which involves a surface area and which is of a certain extent in the radial direction relative to the axis 9 of the disk wheel 3, so that the clamping force applied to the first depressor element 5 by the clamping element 6 acts substantially in the direction of the holding rod member 8. Preferably, as illustrated in FIG. 1, the mounting location 7 for the holding rod member 8 is arranged beneath the point of engagement of the clamping element 6 with the clamping bar 1. In the illustrated embodiment, that point of engagement between the clamping element 6 and the clamping bar 1 is at the upper end of the clamping bar 1, at the gripping device 18.

It will be appreciated that FIG. 2 shows the above-described arrangement in the position in which the series of depressor elements 5 and 13 are operative to depress the associated bead of the tire 17 for a tire fitting or tire removal procedure.

Figure 3:
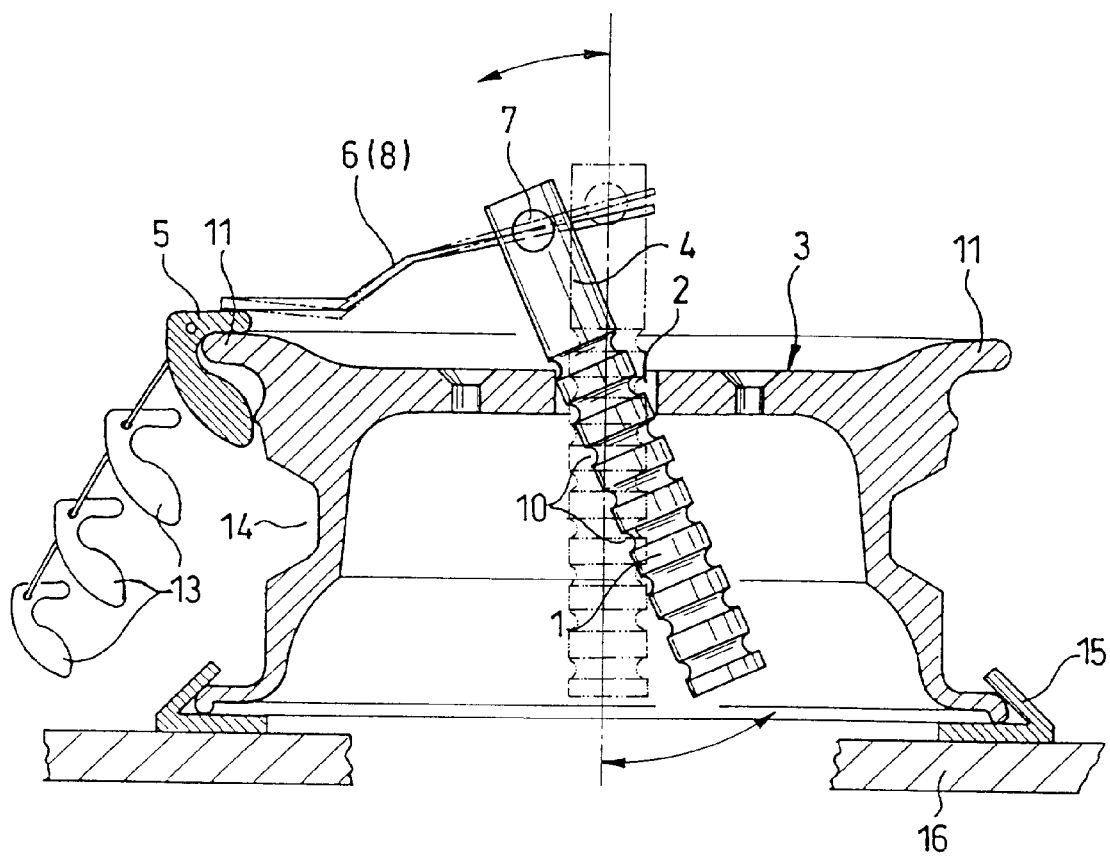
FIG. 3 is a sectional view of a second embodiment of the bead depressor according to the present invention.

Reference will now be made to FIG. 3 showing a further embodiment of a bead depressor according to the invention, in which the above-discussed functions of the clamping element indicated at 6 in FIG. 1 and the holding rod member indicated at 8 in FIG. 1 are performed by a single component. For that purpose, the holding member has the form of a flat steel member which is of a flexurally resilient nature. It should be appreciated that the displaceable connection between the holding member 8 and the clamping bar 1 may be implemented in any one of conventionally known members. The flexural resiliency of the holding member provides the desired clamping force which acts on the first depressor element 3 substantially radially inwardly and on the clamping bar 1 radially outwardly, in particular in the region of the upwardly projecting portion 4 of the clamping bar 1 as would be understood by one of ordinary skill in the art. The component which forms the clamping element 6 and the holding member 8 is also mounted in a rotatable or pivotable mounting location (indicated at 7) on the clamping bar 1, in the region of the upper end of the upwardly projecting portion 4 of the clamping bar 1. For the clamping operation, the combined clamping element and holding member 6 and 8 can be fixed in position by self-holding forces within the mounting location 7 in the braced condition on the clamping bar 1. Alternatively, the arrangement may include an additional securing means (not shown) which maintains the clamping condition of the assembly during the tire fitting or removal procedure. This arrangement also provides a connection which entails contact over a surface area, as between the first depressor element 5 and the clamping bar 1 at the mounting location 7, in particular a form of connection which extends in the radial direction of the disk wheel 3 or in the longitudinal direction of the component indicated at 6 (8) in FIG. 3, which thus constitutes the clamping element and the holding member. Preferably the component 6 (8) which forms the clamping element and the holding member is mounted to the clamping bar 1 displaceably in its longitudinal direction, when the arrangement is in a non-braced condition, at the rotatable mounting location 7. In both of the above-described embodiments of the invention, the location of engagement of the clamping element 6 and the holding rod member 8 or the component combining those two members, in the FIG. 3 embodiment, at the first depressor element 5, the mounting location 7 on the clamping bar 1 and the centering bore 2 on the disk wheel 3, in which the clamping bar 1 is arrested, form the respective corners of a triangle, as can be clearly seen from both FIGS. 1 and 3.

As the structure according to the invention provides that the clamping bar 1 is braced and supported against the disk wheel 3, the bead depressor which essentially comprises the clamping bar 1, the holding member 8, the clamping element 6, or the component combining the holding member 8 and the clamping 6 in FIG. 3, and the depressor elements 13 which are connected by the cable 12, can be universally used irrespective of the respective type of tire-fitting machine involved, while affording ease of handling.

It will be appreciated that the above-described embodiments of the present invention have been set forth solely by way of example and illustration of the principles thereof and that various modifications and alterations may be made therein without thereby departing from the spirit and scope of the invention.

What is claimed is:

1. A bead depressor for mounting or removing a tire with respect to a wheel, comprising:
    a plurality of depressor elements including a first depressor element;
    a cable coupling said plurality of depressor elements together;
    a clamping bar adapted to be disposed and operable in a centering bore in said wheel with a portion of said clamping bar projecting from said wheel;
    a holding member operationally coupling said first depressor element to said clamping bar; and
    a clamping element operatively disposed between said first depressor element and said portion of said clamping bar,
    wherein when said clamping bar is disposed in said centering bore, said clamping element is operable to urge said first depressor element substantially in a radial direction against a rim flange of said wheel to engage said first depressor element on the rim flange.

2. The bead depressor according to claim 1, wherein said clamping element is an elastic element.

3. The bead depressor according to claim 1, wherein said clamping element is a resilient element.

4. The bead depressor according to claim 1, wherein said clamping element and said holding member are separate components.

5. The bead depressor according to claim 1, further comprising:
    a mounting means for rotatably mounting said holding member on said projecting portion of said clamping bar about an axis which is perpendicular to the axis of said wheel.

6. The bead depressor according to claim 4, wherein said holding member is rigid and wherein said clamping element is of a rubber-elastic nature.

7. The bead depressor according to claim 6, wherein said clamping element comprises at least one elastic cord.

8. The bead depressor according to claim 5, wherein said holding member is rigid and wherein said clamping element is of a resilient nature.

9. The bead depressor according to claim 8, wherein said clamping element comprises a tension spring.

10. The bead depressor according to claim 1, wherein said clamping bar can be positioned in said centering bore by a clamping force which acts outwardly in a radial direction from said clamping element.

11. The bead depressor according to claim 1, wherein said clamping bar is adapted to be positioned to bear against diametrally opposite locations of said centering bore.

12. The bead depressor according to claim 1, further comprising:
    an arresting means on said clamping bar adapted to co-operate with said centering bore for arresting said clamping bar therein.

13. The bead depressor according to claim 12, wherein said arresting means is a plurality of notches disposed on said clamping bar.

14. The bead depressor according to claim 1, wherein said said clamping bar portion has an end part and wherein said clamping element is operatively coupled to said end part.

15. The bead depressor according to claim 1, wherein said holding member is elongated and has mounting locations at which the holding member is coupled to said first depressor element and said clamping bar, said mounting locations extending in a longitudinal direction of said holding member.

16. The bead depressor according to claim 1, wherein a coupling location between said holding member, said clamping element and said first depressor element and said, a mounting location for said holding member on the clamping bar in said centering bore and a coupling location between said clamping element and said clamping bar are each positioned at the corners of a triangle.

17. The bead depressor of claim 1, wherein said plurality of depressor elements are sequentially engaged on said rim flange during mounting of the tire to the wheel.

18. The bead depressor of claim 1, wherein said plurality of depressor elements are sequentially disengaged from said rim flange during removal of the tire from the wheel.

19. A bead depressor for mounting or removing a tire with respect to a wheel, comprising:
   a plurality of depressor elements;
   a cable coupling said plurality of depressor elements together;
   a clamping bar adapted to be disposed in a centering bore in said wheel with a portion projecting from said wheel;
   a clamping element operationally coupling a first depressor element of said plurality of depressor elements to said clamping bar, and operatively disposed between said first depressor element and said projecting portion to urge said first depressor element substantially in a radial direction against a rim flange to engage said first depressor element on said rim flange.

20. The bead depressor according to claim 19, wherein said clamping element is a flexurally resilient element.

21. The bead depressor according to claim 19, wherein said clamping element is flexurally resilient to perform an additional function as a holding member.

22. The bead depressor according to claim 19, wherein said clamping bar is adapted to be positioned to bear against diametrally opposite locations of said centering bore.

23. The bead depressor according to claim 21, wherein said clamping element is elongated and has at locations at which the clamping element is coupled to said first depressor element and said clamping bar, mounting means which extend in a longitudinal direction of said clamping element.

24. The bead depressor of claim 23, wherein said clamping element is a flat steel member.

* * * * *